United States Patent
Sullivan et al.

(10) Patent No.: US 10,641,077 B2
(45) Date of Patent: May 5, 2020

(54) DETERMINING ANGULAR OFFSET BETWEEN GEOMAGNETIC AND GRAVITATIONAL FIELDS WHILE DRILLING WELLBORE

(71) Applicant: Weatherford Technology Holdings, LLC, Houston, TX (US)

(72) Inventors: Daniel Sullivan, Houston, TX (US); Liam A. Lines, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 291 days.

(21) Appl. No.: 15/487,214

(22) Filed: Apr. 13, 2017

(65) Prior Publication Data

US 2018/0298743 A1 Oct. 18, 2018

(51) Int. Cl.
*E21B 44/00* (2006.01)
*G01V 11/00* (2006.01)
(Continued)

(52) U.S. Cl.
CPC ............ *E21B 44/00* (2013.01); *E21B 47/022* (2013.01); *E21B 47/024* (2013.01); *G01V 11/00* (2013.01);
(Continued)

(58) Field of Classification Search
CPC ........ E21B 47/024; E21B 47/022; E21B 7/04; E21B 44/00; G01V 11/00; G01V 7/00; G01V 3/00
See application file for complete search history.

(56) References Cited

U.S. PATENT DOCUMENTS 4,416,339 A 11/1983 Baker et al.
5,706,905 A 1/1998 Barr
(Continued)

FOREIGN PATENT DOCUMENTS

EP 1008717 A1 6/2000
WO 2012/012624 A1 1/2012
(Continued)

OTHER PUBLICATIONS

PCT Int'l Search Report received in copending PCT Application No. PCT/US2018/026596 dated Aug. 31, 2018, 15 pages.
(Continued)

*Primary Examiner* — David J Bagnell
*Assistant Examiner* — Jonathan Malikasim
(74) *Attorney, Agent, or Firm* — Blank Rome LLP

(57) ABSTRACT

An apparatus is directed relative to geomagnetic and gravitational fields of reference while advancing with rotation in a borehole by determining angular position of the apparatus during the rotation and correcting the angular position of the apparatus relative to an offset of a toolface of the apparatus. To do the correction, a magnetic toolface of the apparatus during the rotation is determined based on geomagnetic readings of the apparatus in each of a plurality of divisions of the rotation relative to the geomagnetic field, and a gravitational toolface of the apparatus during the rotation is determined based on gravitational readings of the apparatus in each of the divisions of the rotation relative to the gravitational field. The offset of the toolface is then calculated as a difference between the magnetic toolface and the gravitational toolface. The corrected angular position can then be used in directing the apparatus.

21 Claims, 8 Drawing Sheets

(51) Int. Cl.
*E21B 47/022* (2012.01)
*E21B 47/024* (2006.01)
*E21B 7/04* (2006.01)
*G01V 3/00* (2006.01)
*G01V 7/00* (2006.01)

(52) U.S. Cl.
CPC ............. *E21B 7/04* (2013.01); *G01V 3/00* (2013.01); *G01V 7/00* (2013.01)

(56) References Cited

U.S. PATENT DOCUMENTS

| | | | |
|---|---|---|---|
| 6,092,610 | A | 7/2000 | Kosnnala et al. |
| 6,109,370 | A | 8/2000 | Gray |
| 6,116,354 | A | 9/2000 | Buytaert |
| 6,158,529 | A | 12/2000 | Dorel |
| 6,290,003 | B1 | 9/2001 | Russell |
| 6,315,062 | B1 | 11/2001 | Alft et al. |
| 6,470,974 | B1 | 10/2002 | Moore et al. |
| 6,484,819 | B1 | 11/2002 | Harrison |
| 6,837,315 | B2 | 1/2005 | Pisoni et al. |
| 6,840,336 | B2 | 1/2005 | Schaaf et al. |
| 7,360,610 | B2 | 4/2008 | Hall et al. |
| 7,510,027 | B2 | 3/2009 | Weston et al. |
| 7,766,098 | B2 | 8/2010 | Farley |
| 8,294,592 | B2 * | 10/2012 | Weston .................. E21B 19/00 166/254.2 |
| 8,827,006 | B2 | 9/2014 | Moriarty |
| 9,134,131 | B2 * | 9/2015 | Blake .................... E21B 47/024 |
| 9,347,279 | B2 | 5/2016 | Crowley et al. |
| 9,982,525 | B2 * | 5/2018 | Brooks ................ E21B 47/022 |
| 10,119,393 | B2 * | 11/2018 | Derkacz ................ E21B 47/122 |
| 2006/0249287 | A1 | 11/2006 | Downton et al. |
| 2012/0018225 | A1 | 1/2012 | Peter et al. |
| 2013/0092439 | A1 | 4/2013 | Mauldin et al. |
| 2013/0151157 | A1 | 6/2013 | Brooks et al. |
| 2014/0262507 | A1 | 9/2014 | Marson et al. |
| 2016/0002978 | A1 | 1/2016 | Rushton |
| 2016/0090789 | A1 | 3/2016 | Gajji et al. |

FOREIGN PATENT DOCUMENTS

| | | |
|---|---|---|
| WO | 2014/196958 A1 | 12/2014 |
| WO | 2015/127345 A2 | 8/2015 |

OTHER PUBLICATIONS

Schlumberger, "PowerDrive X6," Brochure, copyright 2010, 6-pgs.
Weatherford, "Revelotion(R) Rotary-Steerable System," Brochure, copyright 2015, 12-pgs.

\* cited by examiner

| ANGLE | ACCEL SAMPLE | MAG SAMPLE | QUADRANT | ACCEL SUMMATION | MAG SUMMATION |
|---|---|---|---|---|---|
| 0 | -0.707 | 1.000 | Q0 | -5.37 | 4.30 |
| 15 | -0.866 | 0.966 | | | |
| 30 | -0.966 | 0.866 | | | |
| 45 | -1.000 | 0.707 | | | |
| 60 | -0.966 | 0.500 | | | |
| 75 | -0.866 | 0.259 | | | |
| 90 | -0.707 | 0.000 | Q1 | -0.71 | -3.30 |
| 105 | -0.500 | -0.259 | | | |
| 120 | -0.259 | -0.500 | | | |
| 135 | 0.000 | -0.707 | | | |
| 150 | 0.259 | -0.866 | | | |
| 165 | 0.500 | -0.966 | | | |
| 180 | 0.707 | -1.000 | Q2 | 5.37 | -4.30 |
| 195 | 0.866 | -0.966 | | | |
| 210 | 0.966 | -0.866 | | | |
| 225 | 1.000 | -0.707 | | | |
| 240 | 0.966 | -0.500 | | | |
| 255 | 0.866 | -0.259 | | | |
| 270 | 0.707 | 0.000 | Q3 | 0.71 | 3.30 |
| 285 | 0.500 | 0.259 | | | |
| 300 | 0.259 | 0.500 | | | |
| 315 | 0.000 | 0.707 | | | |
| 330 | -0.259 | 0.866 | | | |
| 345 | -0.500 | 0.966 | | | |

FIG. 6B

TFO SIN & COS DERIVATIONS FROM QUADRANT SUMMATIONS ⎡260

|  | ACCELS | MAGS |
|---|---|---|
| Sin TFO = (Q2 + Q3) - Q0 - Q1 | 12.16 | -2.00 |
| Cos TFO = (Q0 + Q3) - Q1 - Q2 | -9.33 | 15.19 |

*FIG. 6C*

TOOLFACE CALCULATED USING ARCTAN OF SENSOR SIN AND COS COMPONENTS ⎡270

|  | ACCELS | MAGS |
|---|---|---|
| TF (-180 to 180) | 127.50 | -7.50 |
| TF (0-360) | 127.50 | 352.50 |

$$TFO\ (MTF - GTF) = 225.00$$

*FIG. 6E*

DETERMINING ANGULAR OFFSET BETWEEN GEOMAGNETIC AND GRAVITATIONAL FIELDS WHILE DRILLING WELLBORE

BACKGROUND OF THE DISCLOSURE

When drilling for oil and gas, it is desirable to maintain maximum control over the drilling operation, even when the drilling operation may be several kilometers below the surface. Steerable drill bits can be used for directional drilling and are often used when drilling complex borehole trajectories that require accurate control of the path of the drill bit during the drilling operation.

Directional drilling is complicated because the steerable drill bit must operate in harsh borehole conditions. The steering mechanism is typically disposed near the drill bit, and the desired real-time directional control of the steering mechanism is remotely controlled from the surface. Regardless of its depth within the borehole, the steering mechanism must maintain the desired path and direction and must also maintain practical drilling speeds. Finally, the steering mechanism must reliably operate under exceptional heat, pressure, and vibration conditions that will typically be encountered during the drilling operation.

Many types of steering mechanism are used in the industry. A common type of steering mechanism has a motor disposed in a housing with a longitudinal axis that is offset or displaced from the axis of the borehole. The motor can be of a variety of types including electric and hydraulic. Hydraulic motors that operate using the circulating drilling fluid are commonly known as a "mud" motors.

The laterally offset motor housing, commonly referred to as a bent housing or "bent sub", provides lateral displacement that can be used to change the trajectory of the borehole. By rotating the drill bit with the motor and simultaneously rotating the motor housing with the drillstring, the orientation of the housing offset continuously changes, and the path of the advancing borehole is maintained substantially parallel to the axis of the drillstring. By only rotating the drill bit with the motor without rotating the drillstring, the path of the borehole is deviated from the axis of the non-rotating drillstring in the direction of the offset on the bent housing.

Another steering mechanism is a rotary steerable tool that allows the drill bit to be moved in any chosen direction as the drillstring rotates. In this way, the direction (and degree) of curvature of the borehole can be controlled during the drilling operation, and can be chosen based on the measured drilling conditions at a particular borehole depth. Rotary steerable tools can be configured as point-the-bit or push-the-bit system to steer drilling.

Typically, the rotary steerable tool uses a reference of the tool's position while drilling so the tool can steer the advancing borehole in the correct direction. For the reference, the tool uses the angular position of the tool while drilling to steer the wellbore in the correct direction. Position readings are usually obtained from magnetometers and accelerometers on the tool to give the tool's angular position relative to the Earth's geomagnetic or gravitational fields. However, an angular offset (i.e., difference) between the gravitational and geomagnetic reference fields can vary depending on the orientation of the borehole. This angular offset may be referred to as the toolface offset (sometimes referenced as "TFO"). Typically, the toolface offset is calculated when the drilling assembly is stationary.

For example, the rotary steerable tool actively drilling ahead and using only a geomagnetic field or a gravitational field of reference may not need to account for this toolface offset. However, under some circumstances while drilling ahead, the rotary steerable tool may need to orient within the gravitational field of reference (i.e., towards a target gravity toolface) and yet operate internally using the geomagnetic field of reference. In this circumstance, the toolface offset provides the ability to translate the tool's target angularity between the two reference fields.

Because the rotary steerable tool rotates in the advancing borehole and steers ahead in a changing trajectory, a need exists to determine the toolface of the steerable tool and to account for any offset between the geomagnetic and gravitational fields of reference at regular intervals. Typically, these regular intervals are chosen to coincide with periods when the drillstring is stationary, such as when drillstring connections are made at every 30 to 90 feet or so. In some circumstances, however, the toolface offset can change dramatically over the course of a few feet drilled, and the need to calculate the toolface offset while the drilling assembly is stationary is impractical. Accordingly, the borehole in such circumstances can proceed in the wrong direction.

The subject matter of the present disclosure is directed to overcoming, or at least reducing the effects of, one or more of the problems set forth above.

SUMMARY OF THE DISCLOSURE

According to the present disclosure, a method of operating an apparatus is performed while advancing with rotation in a borehole. The method can be used to direct the apparatus externally relative to the gravitational field of reference while internally using the geomagnetic field of reference. The method can be particularly useful while advancing with rotation in the borehole in a deviated direction. As noted previously, advancing the apparatus in the deviated direction can cause the angular relationship between the geomagnetic and gravitational fields of references to change dramatically over the course of a short interval, such as when the apparatus is oriented at particular inclinations and/or azimuths in the deviated borehole.

As noted previously, stopping the advancing apparatus to recalculate its position in such situations may be impractical. Therefore, the apparatus in such situations would tend to advance the borehole in the wrong direction. According to the disclosed method, however, the angular position of the apparatus is determined during rotation in the borehole and is corrected using a dynamically calculated toolface offset. Therefore, stopping the apparatus is not necessary, and the borehole can be advanced in the desired direction.

To do the correction, a magnetic toolface of the apparatus is determined during rotation based on geomagnetic readings of the apparatus in each of a plurality of divisions of the rotation relative to the geomagnetic field of reference. A gravitational toolface of the apparatus is also determined during the rotation based on gravitational readings of the apparatus in each of the divisions of the rotation relative to the gravitational field of reference. Then, the toolface offset is calculated as a difference between the magnetic toolface and the gravitational toolface. Ultimately, the apparatus is directed in the borehole based on the corrected angular position.

There are a number of benefits in directing the apparatus in the borehole based on the corrected angular position according to the disclosed techniques. In particular, the techniques compensate for changes in the toolface offset dynamically while drilling, and the correction is not as computationally intensive as conventional techniques. The disclosed techniques do not require various position sensors of the apparatus, such as magnetometers and gravitational sensors, to be calibrated or compensated for temperature and pressure. Furthermore, the apparatus using the disclosed techniques does not require a geostationary framing element, such as a non-rotating housing or a toothed-ring as used in many rotary steerable systems. Moreover, the apparatus using the disclosed techniques can function even during irregular downhole RPM.

In one technique for correcting the toolface of the apparatus relative to the offset, the geomagnetic readings of the apparatus are obtained relative to the geomagnetic field of reference during the rotation, and the gravitational readings of the apparatus are obtained relative to the gravitational field of reference during the rotation. The rotation is divided into quadrants for the divisions using at least one of the geomagnetic and gravitational readings. The geomagnetic readings in each of the quadrants are summed together for first sums, and the gravitational readings in each of the quadrants are summed together for second sums.

To then determine the magnetic toolface of the apparatus, a sine component of the magnetic toolface is derived from a first combination of the first sums of the quadrants, and a cosine component of the magnetic toolface is derived from a second combination of the first sums of the quadrants. The magnetic toolface is then calculated from an arctangent of the sine and cosine components. Determining the gravitational toolface of the apparatus can involve comparable derivations and calculations based on the second sums.

The angular position can be obtained in a number of ways and using a number of sensors. In a preferred technique, angular rate readings are obtained of the rotation of the apparatus using, for example, an angular rate sensor. Angular position readings of the apparatus relative to geomagnetic or gravitational fields are obtained at fixed points during the rotation and are used to adjust the angular rate readings to provide near continuous angular position of the apparatus in high resolution. The angular position readings can be derived from the geomagnetic readings of the apparatus relative to the geomagnetic field during the rotation.

As noted above, the technique uses divisions of the rotation to dynamically calculate the toolface offset for ultimately correcting the angular position of the apparatus. To determine the divisions, each of the rotations can be divided into the plurality of divisions using at least one of the geomagnetic and gravitational readings. For example, zero-crossings can be detected for at least orthogonal ones of the geomagnetic or gravitational readings, and the detected zero-crossings can be used as dividing points for the divisions.

Although adjusting the calculated toolface offset may be sufficient on its own, the technique can further adjust the calculated toolface offset by at least one dynamic parameter. For example, the apparatus can use current information about the inclination and/or azimuth of the apparatus to determine dynamic adjustments to the calculated toolface offset.

Directing the apparatus depends on the particular components of the apparatus. For example, rotation can be imparted to the apparatus advancing the borehole. Actuations of at least one actuator on the apparatus can be determined during the rotation for steering the apparatus towards a target direction relative to the corrected angular position of the apparatus, and the apparatus can then be deviated in the advancing borehole in response to the determined actuations of the at least one actuator.

According to the present disclosure, an apparatus advancing with rotation in a borehole includes at least one sensing element and a control system. The at least one sensing element obtains geomagnetic readings of the apparatus relative to the geomagnetic field during the rotation and obtains gravitational readings of the apparatus relative to the gravitational field during the rotation. The control system is in operable communication with the at least one sensing element. The control system is configured to: determine angular position of the apparatus during rotation in the borehole; determine a magnetic toolface of the apparatus during the rotation based on geomagnetic readings of the apparatus in each of a plurality of divisions of the rotation relative to the geomagnetic field; and determine a gravitational toolface of the apparatus during the rotation based on gravitational readings of the apparatus in each of the divisions of the rotation relative to the gravitational field. With these determinations, the control system is configured to calculate the offset of the toolface as a difference between the magnetic toolface and the gravitational toolface and to correct the angular position of the apparatus relative to the offset of the toolface.

The apparatus can be a steerable tool of a drilling assembly and include at least one actuator being actuatable to direct the apparatus in advancing the borehole. The control system can thereby be configured to direct the apparatus with the at least one actuator in the borehole based on the corrected angular position.

The foregoing summary is not intended to summarize each potential embodiment or every aspect of the present disclosure.

BRIEF DESCRIPTION OF THE DRAWINGS

FIGS. 6A-6E further illustrate structures for the sensor processing of the present disclosure.

DETAILED DESCRIPTION OF THE DISCLOSURE

Figure 1:
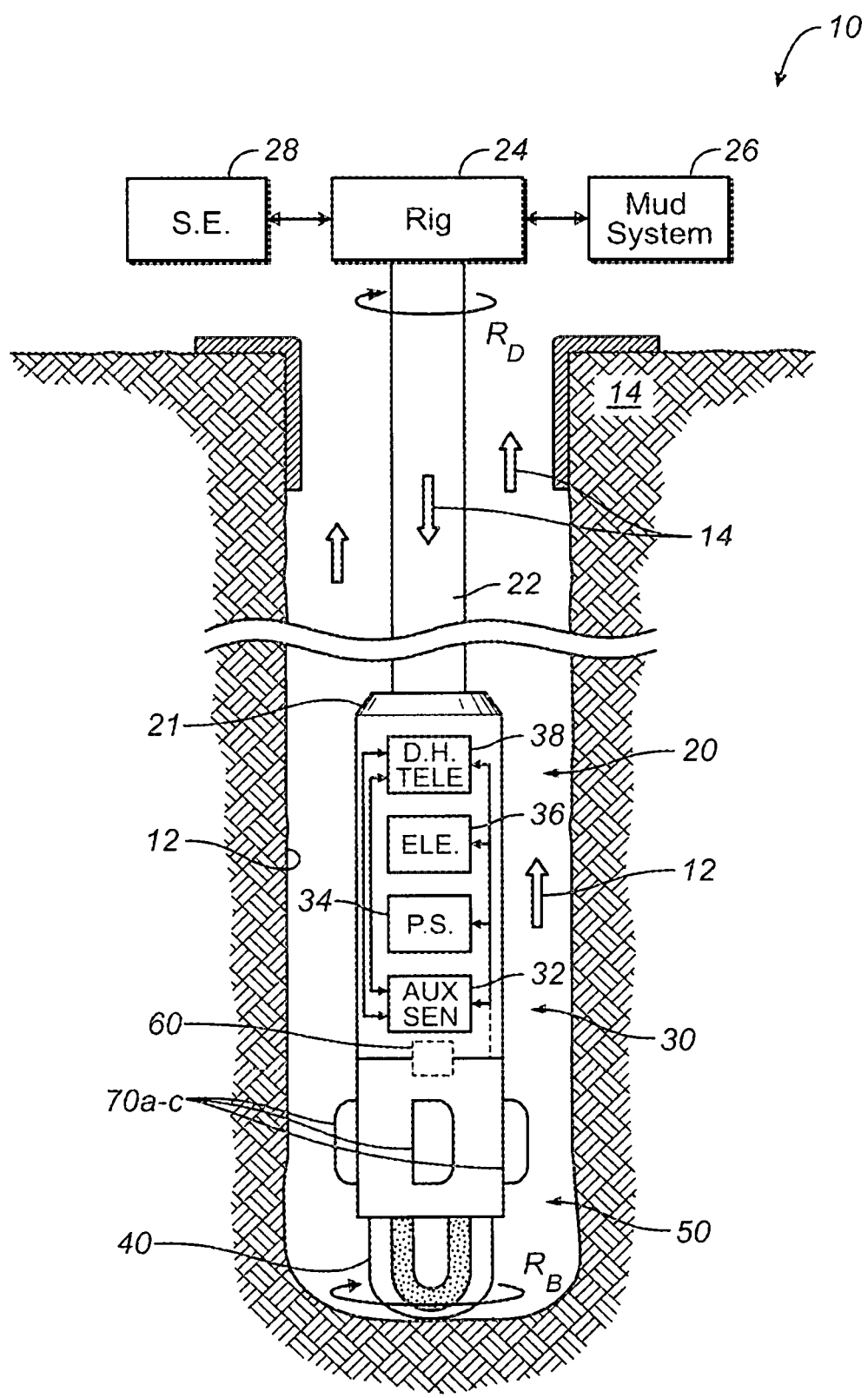
FIG. 1 schematically illustrates a downhole assembly having a rotary steering apparatus according to the present disclosure.

FIG. 1 schematically illustrates a drilling system 10 incorporating a rotary steering apparatus 50 according to the present disclosure. As shown, a downhole drilling assembly 20 drills a borehole 12 penetrating an earth formation. The assembly 20 is operationally connected to a drillstring 22 using a suitable connector 21. In turn, the drillstring 22 is operationally connected to a rotary drilling rig 24 or other known type of surface drive.

The downhole assembly 20 includes a control assembly 30 having a sensor section 32, a power supply section 34, an electronics section 36, and a downhole telemetry section 38. The sensor section 32 has various sensing elements, such as directional sensors, accelerometers, magnetometers, and inclinometers, which can be used to indicate the orientation, movement, and other parameters of the downhole assembly 20 within the borehole 12. This information, in turn, can be used to define the borehole's trajectory for steering purposes. The sensor section 32 can also have any other type of sensors used in Measurement-While-Drilling (MWD) and Logging-While-Drilling (LWD) operations including, but not limited to, sensors responsive to gamma radiation, neutron radiation, and electromagnetic fields.

The electronics section 36 has electronic circuitry to operate and control other elements within the downhole assembly 20. For example, the electronics section 46 has downhole processor(s) (not shown) and downhole memory (not shown). The memory can store directional drilling parameters, measurements made with the sensor section 32, and directional drilling operating systems. The downhole processor(s) can process the measurement data and telemetry data for the various purposes disclosed herein.

Elements within the downhole assembly 20 communicate with surface equipment 28 using the downhole telemetry section 28. Components of this telemetry section 38 receive and transmit data to an uphole telemetry unit (not shown) within the surface equipment 38. Various types of borehole telemetry systems can be used, including mud pulse systems, mud siren systems, electromagnetic systems, angular velocity encoding, and acoustic systems.

The power supply section 34 supplies electrical power necessary to operate the other elements within the assembly 20. The power is typically supplied by batteries, but the batteries can be supplemented by power extracted from the drilling fluid by way of a power turbine, for example.

During operation, a drill bit 40 is rotated, as conceptually illustrated by the arrow RB. The rotation of the drill bit 40 is imparted by rotation RD of the drillstring 22 at the rotary rig 24. The speed (RPM) of the drillstring rotation RD is typically controlled from the surface using the surface equipment 28. Additional rotation to the drill bit 40 can also be imparted by a drilling motor (not shown) on the drilling assembly 20.

During operation, the drilling fluid system 26 pumps drilling fluid or "mud" from the surface downward and through the drillstring 22 to the downhole assembly 20. The mud exits through the drill bit 40 and returns to the surface via the borehole annulus. Circulation is illustrated conceptually by the arrows 14.

The steering apparatus 50 rotates with the drill string 22 in imparting rotation to the drill bit 40. To directionally drill the advancing borehole 12 with the downhole assembly 20, a control system or controller 60 operates, actuates, activates, etc. one or more directional devices 70a-c on the apparatus 50. Preferably, multiple devices 70a-c can be operated independently on the apparatus 50, and the control system 60 can operate the devices 70a-c individually using hydraulic, mechanical, and other configurations.

The steering apparatus 50 can use a rotary steerable configuration, such as disclosed in co-pending U.S. application Ser. No. 15/282,242, filed 30 Sep. 2016, which is incorporated herein by reference. Such a configuration can activate multiple individual steering devices during the course of one rotation of the drilling assembly 20. To ensure the configuration steers effectively, the angular position of the steering apparatus 50 is particularly measured in the presence of extreme downhole dynamics, and the angular position is preferably measured with high precision and at a high frequency.

In a hydraulic configuration of the steering apparatus 50, for example, the control system 60 changes delivery of a portion of the flow of the fluid (circulated drilling mud) to actuate the devices 70a-c. In a mechanical configuration, the control system 60 changes physical engagement to actuate the devices 70a-c. Either way, the independent operation of the multiple directional devices 70a-c alters the direction of the steering apparatus 50 as it advances the borehole 12. The independent extension/retraction of the directional devices 70a-c can be coordinated with the orientation of the drilling assembly 20 in the advancing borehole 12 to control the trajectory of drilling. The extension/retraction of the directional devices 70a-c disproportionately engages the drill bit 40 against a certain side in the advancing borehole 12 for directional drilling. (Reference to disproportionate engagement at least means that the engagement in advancing the borehole 12 is periodic, varied, repetitive, selective, modulated, changing over time, etc.)

To direct the trajectory of the advancing borehole 12, the control system 60 uses orientation information measured by the sensor section 32 cooperating with control information stored in the downhole memory of the electronics section 36. The orientation information can include a number of measurements, such as angular position measurements, accelerometer measurements, magnetometer measurements, inclination, azimuth, gravitational highside, geomagnetic north, etc. In some circumstances, angular position measurements of the steering apparatus 50 can require an offset between the gravitational highside and the geomagnetic north to be known. For example, the apparatus 50 may need to use the toolface offset to translate the tool's target angularity between the two reference fields based on the well plan, which can suggest how much magnetic to gravitational toolface offset there could be for various drilling intervals. For this purpose, processing techniques disclosed herein can be used.

In addition to a steering apparatus 50 for a drilling assembly 20 discussed above, other types of systems or devices can benefit from the techniques disclosed herein. In general, any downhole tool that houses its control system or sensors in a rotating section of the tool may need to use the toolface offset to translate the tool's target angularity between the gravitational and geomagnetic reference fields. As one example, an azimuthal logging tool can use the teachings of the present disclosure to determine a direction of (or to direct) the tool relative to the gravitational field using the geomagnetic field of reference while advancing with rotation in a borehole.

Figure 2:
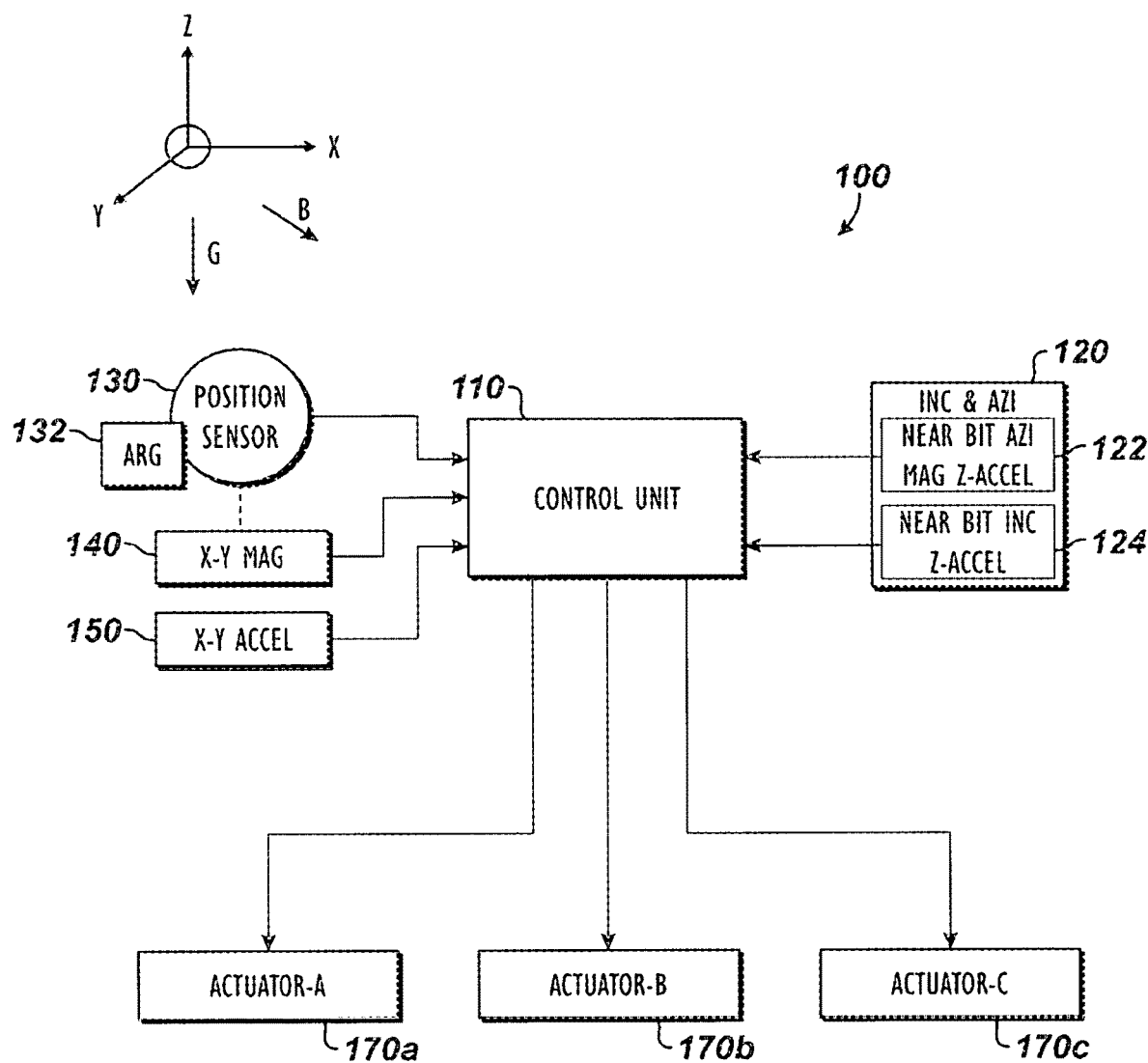
FIG. 2 schematically illustrates a control system for a rotary steering apparatus according to the present disclosure.

Given the above description of the steering apparatus 50, discussion now turns to more details related to a steering mechanism for the apparatus 50 to achieve directional drilling. FIG. 2 schematically illustrates a steering mechanism 100 for the rotary steering apparatus 50 according to the present disclosure. The steering mechanism 100 as depicted here can combine or can be part of one or more previously disclosed elements, such as the control assembly 30, control system 60, etc., which are consolidated in the description here. Separate reference to some of these components may have been made previously in the disclosure for the sake of simplicity.

As noted, the steering apparatus 50 can use a rotary steerable configuration, such as disclosed in incorporated U.S. application Ser. No. 15/282,242. Such an apparatus 50 can use a control system, such as disclosed in co-pending U.S. application Ser. No. 15/282,379, filed 30 Sep. 2016, which is also incorporated herein by reference. Therefore, aspects of the steering mechanism 100 disclosed herein can incorporate features of the configurations and control systems disclosed in these incorporated U.S. applications. Again, other configurations for rotary steerable tools, which house their control system or sensors in a rotating section of the tools, can benefit from the teachings disclosed herein.

The steering mechanism 100 includes a processing control unit 110 having processor(s), memory, etc. Sensor elements 120, 130, 140, and 150 interface with the processing unit 110 and may use one or more analog-to-digital converters (not shown) to do so. In general, the processing unit 110 can interface with various sensor elements, including inclinometers, magnetometers, accelerometers, temperature sensors, and other sensors that provide position information to the processing unit 110.

As particularly shown, an inclinometer and azimuthal sensor element 120 can include a near-bit azimuthal sensor 122 and a near-bit inclinometer sensor 124, which may use magnetometers and Z-axis accelerometers. Additionally, orthogonal X-Y magnetometers 140 and orthogonal X-Y accelerometers 150 give readings for respective orientation of the apparatus 50 relative to the geomagnetic field B and the gravitational field G.

Finally, the steering mechanism 100 may use a position sensor 130 to determine the angular position of the apparatus 50. The position sensor 130 can use an angular rate or velocity sensor, such as an angular rate gyroscope 132. Technically, the angular rate gyroscope 132 as an angular velocity sensor is not a "position" sensor. However, for the purposes of the present disclosure, use of the angular rate gyroscope 132 in conjunction with other sensors discussed herein provide the requisite position information for the purposes of the present disclosure. For example, angular rate readings of the rotation can be obtained with the angular rate gyroscope 132. Angular position readings of the apparatus 50 can also be obtained during the rotation using the orthogonal magnetometers 140 and detected zero-crossings. The angular rate readings (of the gyroscope 132) can then be adjusted based at least on regular angular position readings (of the magnetometers 140) to determine the angular position of the apparatus 50 in high resolution.

Using the angular rate gyroscope 132 can offer a number of advantages. For example, angular rate readings of the angular rate gyroscope 132 can be integrated to obtain the angular position in high resolution. In turn, this high resolution angular position can be used as an integral/positional framing reference in addition to, or in substitution for, using the zero-crossings detected from the orthogonal magnetometers 140 or accelerometers 150 as the framing reference. In fact, using the angular rate gyroscope 132 may in principle make it possible for the apparatus 50 to use only a single magnetometer 140 and/or a single accelerometer 150. Finally, the angular rate gyroscope 132 can be used in place of a geostationary framing element, such as a toothed ring to generate pulses based on position.

The processing unit 110 can communicate with other components of the apparatus (50) via communication circuitry and a bus and can store information in memory (not shown). Finally, the processing unit 110 interfaces with one or more actuator modules 170a-c of the apparatus (50), which are used to actuate the one or more directional devices (70a-c) as noted herein.

During operation, the steering mechanism 100 operates based on discrete position information obtained with the various sensor elements 120, 130, 140, 150, etc. The resolution of the position information can be 0.5 ms@300 rpm, which can give an angular resolution of about 0.9° for the apparatus' rotation. As discussed later, for example, the processing unit 110 communicates with the various sensor elements 120, 130, 140, and 150 to detect certain parameters, such as azimuth, inclination, gravitational highside, geomagnetic north, static gravity, toolface, rotary quadrants of the apparatus (50), and the like during operation.

Figure 3B:
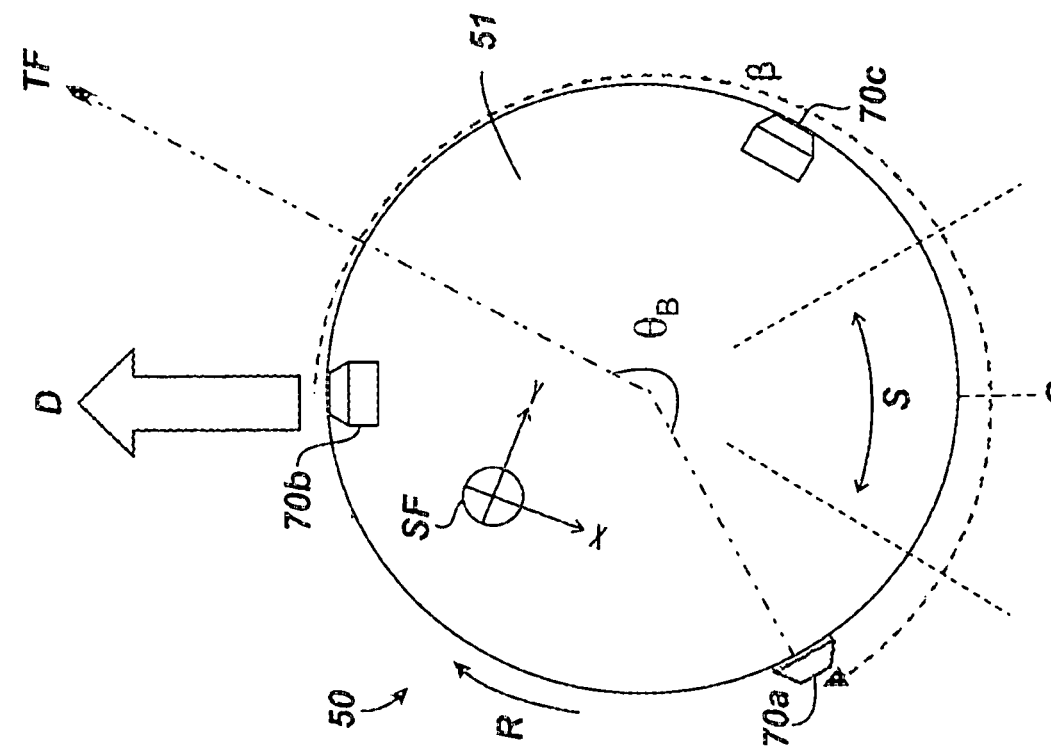
FIGS. 3A-3B schematically illustrate end views of the steering apparatus during operation.
Figure 3A:
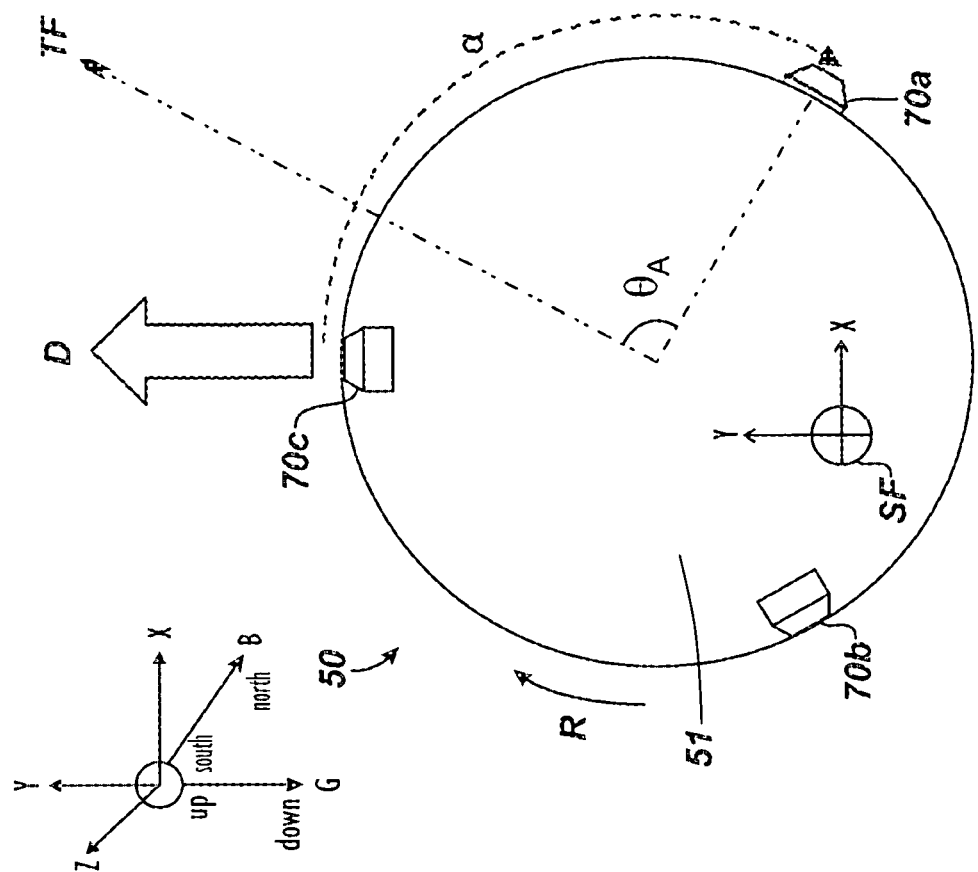

Using a control process discussed below, the processing unit 110 processes the inputs of the various sensor readings. In turn, the processing unit 110 provides actuator control signals to the actuator modules 170a-c to steer the apparatus (50). For illustrative purposes, FIGS. 3A-3B schematically illustrate end views of the steering apparatus 50 during operation in two states of operation. As noted herein, the steering apparatus 50 has one or more directional devices 70a-c disposed around the apparatus' housing 51, such as the three directional devices 70a-c depicted here. As also noted herein, the apparatus 50 is capable of controlling one or more actuators (170a-c) to extend the directional devices 70a-c as they rotate with the housing 51.

As expressed herein, the housing 51 having the directional devices 70a-c rotates with the drillstring (22), and the housing 51 imparts rotation to the drill bit (40). As these components rotate, the transverse displacement of the directional devices 70a-c can then displace the longitudinal axis of the housing 51 relative to the advancing borehole. This, in turn, tends to change the trajectory of the advancing borehole. To do this, the independent extensions/retractions of the directional devices 70a-c are timed relative to a desired direction D to deviate the apparatus 50 during drilling. In this way, the apparatus 50 operates to push the bit (40) to change the drilling trajectory.

FIGS. 3A-3B show one of the movable directional devices 70a extended on the housing 51 during a first rotary orientation (FIG. 3A) and then during a later rotary orientation (FIG. 3B) after the housing 51 has rotated. Because the steering apparatus 50 is rotated along with the drillstring (22), the operation of the steering apparatus 50 is cyclical to substantially match the period of rotation of the drillstring (22).

As the steering apparatus 50 rotates, for instance, the orientation of the directional devices 70a-c is determined by the steering mechanism (100), position sensors, toolface (TF), etc. When it is desired to deviate the drill bit (40) in the desired direction D, then it is necessary to extend one or more of the directional devices 70a-c as they face toward the opposite direction O. The steering mechanism (100) calculates the orientation of the diametrically opposed position O and instructs the actuators (170a-c) for the directional devices 70a-c to operate accordingly. Specifically, the steering mechanism (100) may produce the actuation so that one directional device 70a extends at a first angular orientation ($\alpha$ in FIG. 3A) relative to the desired direction D and then retracts at a second angular orientation ($\beta$ in FIG. 3B) in the rotation R of the steering apparatus 50.

Because the directional device 70a is rotating in direction R with the housing 51, orientation of the directional device 70a relative to a reference point is determined using the toolface (TF) of the housing 51. This thereby corresponds to the directional device 70a being actuated to extend starting at a first angular orientation $\theta_A$ relative to the toolface (TF) and to retract at a second angular orientation $\theta_B$ relative to the toolface (TF). The toolface (TF) of the housing 51 can be determined by the steering mechanism (100) using the sensors and techniques discussed below.

Because the directional device 70a does not move instantaneously to its extended condition, it may be necessary that the active deflection functions before the directional device 70a reaches the opposite position O and that the active deflection remains active for a proportion of each rotation R. Thus, the directional device 70a can be extended during a segment or width S of the rotation R best suited for the directional device 70a to extend and retract relative to the housing 51 and engage the borehole to deflect the housing 51. The RPM of the housing's rotation R, the drilling direction D relative to the toolface (TF), the operating metrics of the directional device 70a, and other factors involved can be used to define the segment S. If desired, it can be arranged that the angles α and β are equally-spaced to either side of the position O, but because it is likely that the directional device 70a will extend gradually (and in particular more slowly than it will retract) it may be preferable that the angle β is closer to the position O than is the angle α.

Of course, the steering apparatus 50 as disclosed herein has the additional directional devices 70b-c arranged at different angular orientations about the housing's circumference. Extension and retraction of these additional directional devices 70b-c can be comparably controlled in conjunction with what has been discussed above with reference to FIGS. 3A-3B so that the steering mechanism (100) can coordinate multiple retractions and extensions of the several directional devices 70a-c during each of (or one or more of) the rotations R. Thus, the displacement of the housing 51 and directional devices 70a-c can be timed with the rotation R of the drillstring (22) and the apparatus 50 based on the orientation of the steering apparatus 50 in the advancing borehole. The displacement can ultimately be timed to direct the drill bit (40) in a desired drilling direction D and can be performed with each rotation or any subset of the rotations.

A. SENSOR CONFIGURATION

As shown in FIGS. 3A-3B, a sensor reference frame SF is depicted with orthogonal X-Y axes indicative of the orthogonal arrangement for the X-Y magnetometers (140) and X-Y accelerometers (150) of the steering mechanism (100). As can be seen during rotation of the apparatus (50), the sensor reference frame SF changes orientation with respect to the gravitational field G and geomagnetic field B. These magnetic and gravitational sensors (140, 150) mounted laterally on a constantly rotating housing 51 will generate characteristically sinusoidal waveforms, both of which have time periods that are directly proportional to the speed of rotation.

In addition, the points on the sinusoid where the waveform is either at a maximum or minimum will automatically relate to the angular positions at which each sensor (140, 150) happens to become parallel with the field G or B that they are sensing. For the X-Y accelerometers (150), these points relate to the accelerometers' alignment with either the 0 or 180-degree gravity toolface (i.e., 'Up' or 'Down'). Meanwhile, the maxima and minima points on the waveforms for the X-Y magnetometers (140) correspond to the azimuthal compass alignments of 0 and 180-degrees, (i.e., due 'North' and 'South').

It therefore follows that the phase difference, specified in degrees of arc, between the accelerometer and magnetometer maximum points directly represent the angular offset between the accelerometers' 'Up' direction and the magnetometers' 'North' direction. This phase difference is therefore equivalent to a toolface offset value, which has been described previously and which is of particular usefulness in controlling the rotary steerable apparatus (50).

The technique described herein below can allow the steering mechanism (100) to determine an angle of the toolface offset while the apparatus (50) is rotating, without the need to rapidly resolve X-Y sensor input pairs and calculate their respective toolface values. As will be appreciated, attempting to rapidly resolve X-Y sensor input pairs into their respective toolface values can be difficult, especially with accelerometers when drilling shock and vibrations are factored in. Additionally, the resolution can be computationally intensive due to the rapid sampling and compensations needed of the raw sensor values.

As long as the steering mechanism 100 of FIG. 2 drilling ahead maintains a geometrically straight borehole (i.e., where inclination and azimuth are considered to be reasonably constant), the processing unit 110 can acquire a value of a toolface offset between the gravitational and geomagnetic fields G or B of reference during a stationary period when the apparatus (50) is not rotating. The processing unit 110 can then use such a stored toolface offset value while drilling ahead such a geometrically straight borehole. Accordingly, the stored toolface offset value may be considered accurate enough for the steering mechanism 100 to accurately translate a magnetic toolface target into its associated gravitational toolface direction in these conditions.

However, any deviation in the direction of the borehole will result in a change in the angular relationship between the geomagnetic and gravitational fields B and G of reference. The rate at which the toolface offset changes is entirely dependent on the direction in which the borehole is aligned. For example, some deviated directions produce relatively small changes (i.e., in the range of 1 or 2 degrees per 100 feet) in the angular relationship between the geomagnetic and gravitation fields B and G, while other directions produce changes in the toolface offset of up to 60 degrees for similar distances drilled.

The large variation in the toolface offset can cause the steering mechanism 100 to fail to accurately track the steering and can result in a borehole that diverges from the intended profile with a building error during the section being drilled. To avoid such possible errors, borehole trajectories can be designed to avoid drilling certain well profiles to minimize exposure to certain circumstances (drilling East West, near magnetic dip angle, etc.) that can cause significant and rapid changes in the geomagnetic to gravitational angular offsets (i.e., toolface offset) while drilling. The drilling process can take regular static surveys to update geomagnetic to gravitational angular offsets to minimize error over the footage drilled.

Although the above may be useful, designing the drilling trajectory to avoid certain issues or taking static surveys by stopping the drilling process can complicate and slow the drilling operations so the steering mechanism 100 may not always use such techniques. The steering mechanism 100 can uses a geo-stationary sensor platform in the apparatus so some of the mechanism's accelerometers used while rotating the drillstring can constantly generate a highside gravitational reference. As will be expected, the apparatus 50 may not include such a geo-stationary sensor platform, or it may not always operate as proposed.

Generally, establishing an accurate toolface offset during periods of rotation is achieved by rapid acquisition of the necessary X and Y-components of the magnetic and gravitational sensors 140, 150. For the acquired set of sensor data to be considered mathematically orthogonal, the sensor data needs to be acquired in as short a timeframe as possible, ideally at exactly the same moment in time. Failure to achieve this orthogonality will result in errors in the toolface offset measurement that are proportional to the non-orthogonality of the data.

Once the individual sensor outputs are acquired, the system can mathematically derive the latest toolface offset by resolving the individual X and Y-component pairs into their corresponding vector toolface and then calculating the angular difference between these toolfaces. This angular difference is then considered to be an updated toolface offset.

Due to potentially large variations in the toolface offset, the rotary steerable tool (50) that is in the process of drilling ahead preferably tracks the variation in the toolface (TF) as it deviates from a previous measurement. A failure to track this change accurately may result in delivering a borehole that diverges from the intended profile at a rate which is a function of the rate at which the toolface offset error builds up during the section being drilled.

Figure 4:
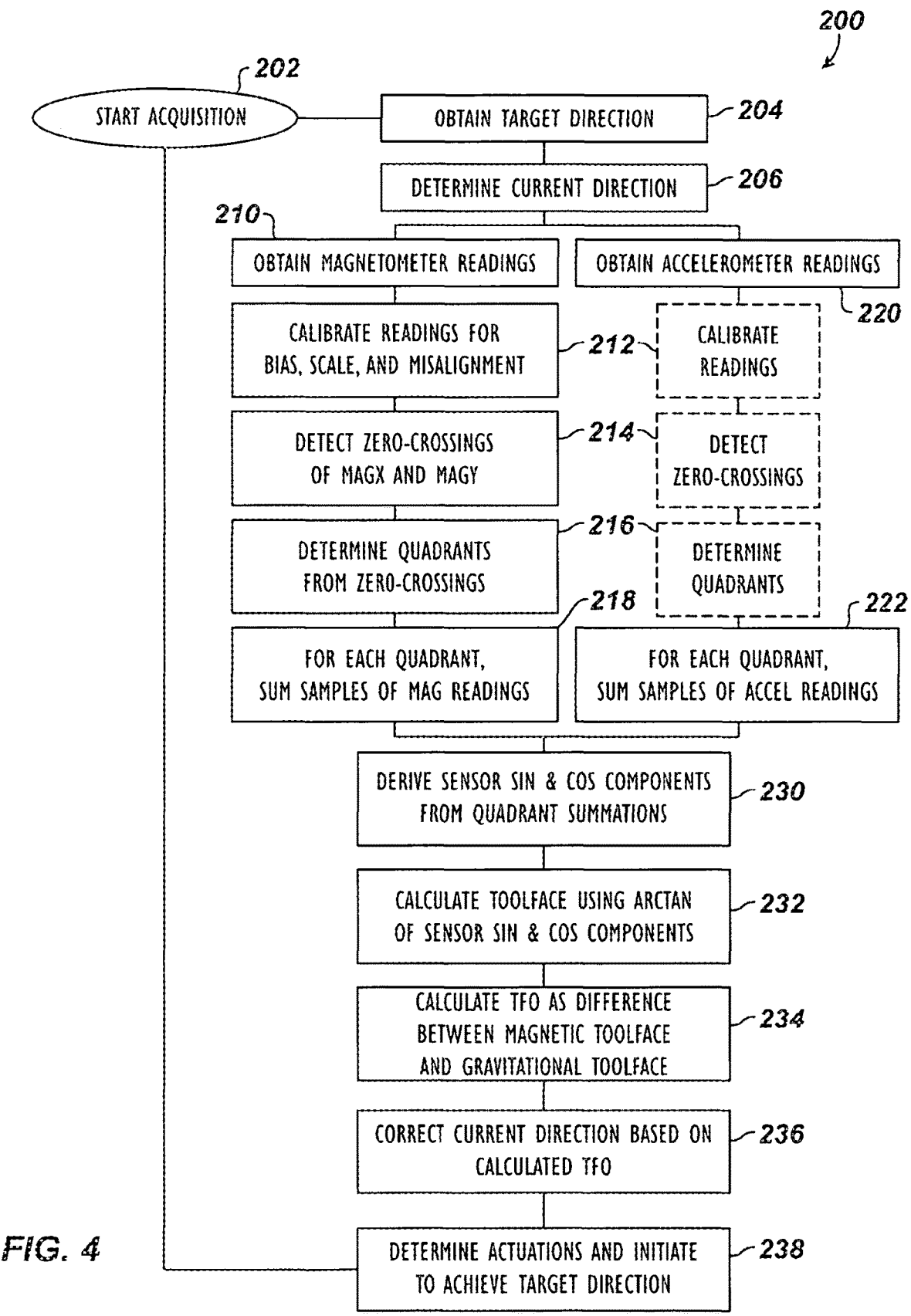
FIG. 4 illustrates a flow diagram of a control technique for the disclosed steering apparatus.

Because rapid acquisition of sensor signals and other processing issues cause difficulties, the steering mechanism 100 of the present disclosure preferably uses a processing technique disclosed in FIG. 4. In particular, FIG. 4 illustrates a flow diagram of a processing technique 200 for the disclosed steering mechanism 100 of the apparatus 50 to correct the angular position determined for the steering mechanism 100 using a calculated offset of the toolface. (For understanding, reference to components to other Figures are provided.) During operation of the apparatus 50 in steering an advancing borehole, acquisition starts 202 with the steering mechanism 100 obtaining a target direction D (Block 204). The apparatus 50 has a current direction so the steering mechanism 100 determines the current direction, which can be stored in processing (Block 206).

The control technique now acquires the necessary readings for determining and controlling the direction of the apparatus 50 as it rotates. Part of this acquisition involves obtaining magnetometer readings from the X-Y magnetometers 140 (Block 210) and obtaining readings from the X-Y accelerometers 150 (Block 220).

If necessary, the magnetometer readings can be calibrated for bias, scale, and misalignment (Block 212). For example, any known mechanical misalignment of the X-Y magnetometers can be applied to the magnetometer readings. Also, corrections for the X-Y rotating biases and the X-Y rotating scales can be applied to the magnetometer readings. However, the techniques of the present disclosure allow for raw sensor readings to be used from the magnetometers and the like that are not calibrated.

The steering mechanism 100 detects the zero-crossings of the X-Y magnetometers 140 (Block 214). These correspond to the points in which the waveforms of the X-Y magnetometers 140 cross a zero amplitude. From these zero-crossings, the steering mechanism 100 determines rotary quadrants (Q0, Q1, Q2, and Q3) of the apparatus' rotation (Block 216).

Figure 5:
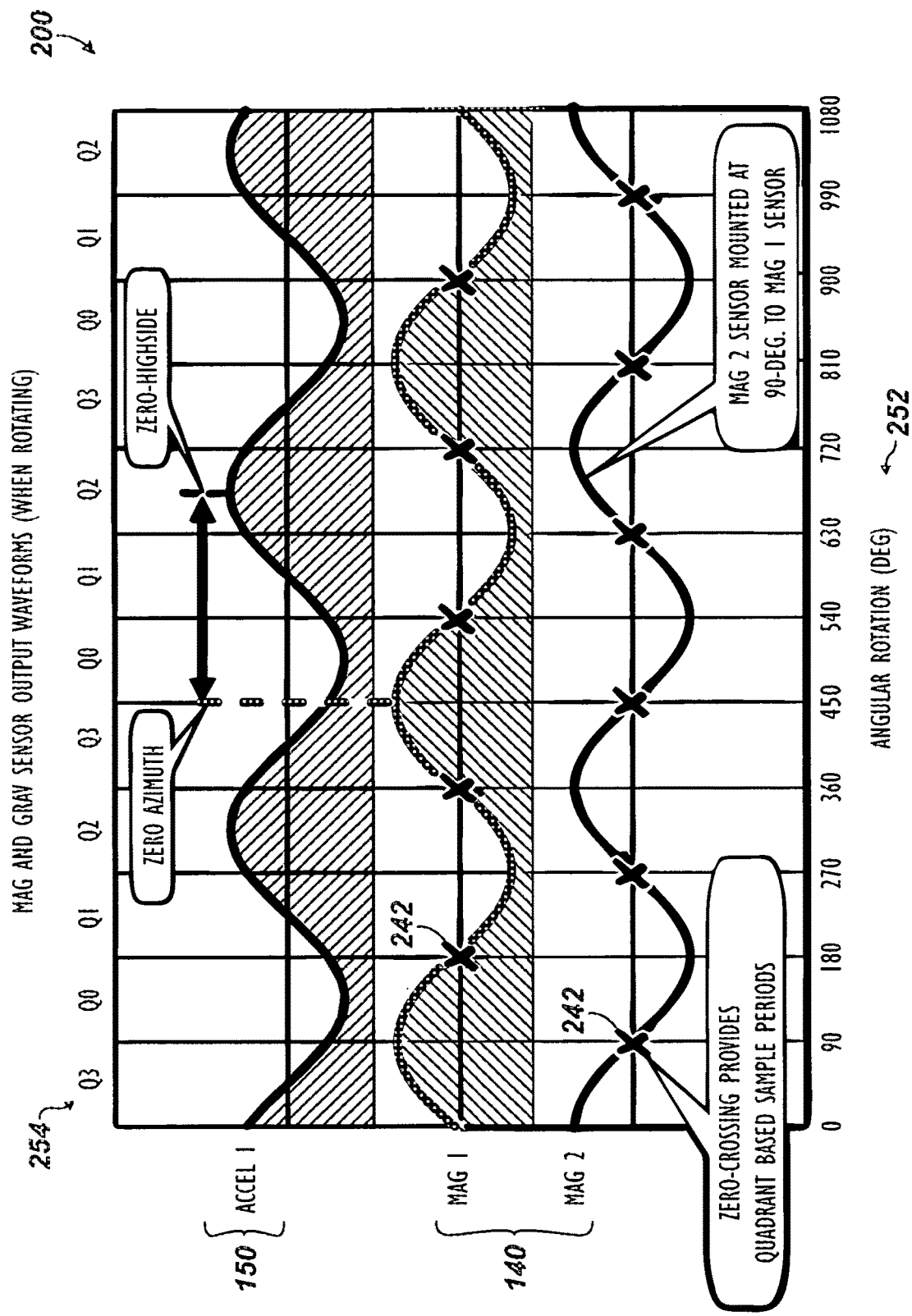
FIG. 5 diagrams sensor processing in the control techniques of the present disclosure.

For example, FIG. 5 graphs the magnetometer and accelerometer output waveforms of the apparatus 50 when rotating. The X-Y magnetometers 140 are mounted at 90-degrees from one another so that they have a shifted phase. The zero-crossings of the magnetometer waveforms provide the points in the angular rotation of the apparatus for delimiting the rotation in rotary quadrants (Q0, Q1, Q2, and Q3).

Use of zero-crossings of two magnetometer waveforms offers one way to delimit the rotation into equal divisions (i.e., quadrants). In general, more or less divisions could be used in the present techniques rather than the four quadrants noted here. In other words, magnetometers 140 at other orientations can provide zero-crossings at other intervals for the purpose of creating divisions. For example, in addition to the set of two orthogonal magnetometers 140 already noted, an additional set of magnetometers 140 situated orthogonally to one another, but at 45-degrees relative to the original set, can increase the number of zero crossings for use as divisions. In fact, use of such multiple sets of magnetometers 140 can eliminate the need to use an angular rate gyroscope 132 in the position determination. In addition, although the zero-crossings of magnetometers 140 are used, it would be equally possible to use zero-crossings of accelerometer waveforms to delimit the rotation.

Returning to the process 200 of FIG. 4, the steering mechanism 100 sums samples for each quadrant (Q0, Q1, Q2, and Q3) of one of the magnetometer readings (i.e., Mag1) (Block 218) and likewise sums samples of one of the accelerometers readings (i.e., Accel1) (Block 222).

At this point, the steering mechanism 100 performs calculations to determine an angle of the toolface offset. As noted, depending on the angular relationship between the geomagnetic and gravitational fields of reference, the trajectory of the steering mechanism 100 may produce offset values in the range of 1 or 2 degrees or even up to 60-degrees or more per 100 feet drilled. The calculations are intended to determine the toolface offset under current conditions so the steering mechanism 100 can account for this difference. In particular and as will be detailed more later, the steering mechanism 100 derives sensor sine and cosine components from the quadrant summations (Block 230), calculates the magnetic and gravitational toolfaces using an arctangent of the sine and cosine components (Block 232), and calculates the toolface offset as a difference between the magnetic and gravitational toolfaces (Block 234).

At this point, the steering mechanism 100 continues with control of the apparatus 50 based on the calculated data. In particular, the steering mechanism 100 corrects the current direction based on the angle of the calculated toolface offset (Block 236). Overall, the steering mechanism 100 directs the apparatus 50 relative to the gravitational field of reference using the geomagnetic field of reference while advancing with rotation in the borehole. Under an opposite arrangement, the steering mechanism 100 can be viewed as directing the apparatus 50 relative to the gravitational field of reference using the geomagnetic field of reference while advancing with rotation in the borehole.

In the end, the steering mechanism 100 then determines actuations for the actuators 170a-c and initiates those actuations to achieve the target direction (Block 238). The control technique 200 then repeats over time to rectify the steering of the apparatus 50 toward the target direction. This control process 200 may be a constant function of the steering mechanism 100 as it controls the apparatus 50.

Alternatively, some of the particulars of calculating the toolface offset according to this technique 200 may only be initiated at certain inclinations, azimuths, deviated directions, etc. of the apparatus 50. For example, there may be some particular inclination, azimuth, or the like that triggers the apparatus 50 to use this toolface offset calculation. In other situations, the toolface offset may be determined at least in part using other conventional ways discussed previously, such as when the apparatus 50 is stationary.

In some situations, the apparatus 50 may not need to use the current toolface offset calculation, such as when the apparatus 50 is running only in a magnetic mode or only in a gravitational mode. For example, during vertical drilling the apparatus 50 may be running purely in a gravitational mode so that the current toolface offset calculation is not needed. As another example, the apparatus 50 may not perform the current toolface offset calculation when drilling down a dip because there may be little magnetic amplitude to measure.

In the current technique 200, at least two magnetometers 140 obtain orthogonal geomagnetic readings to divide the rotation into the divisions based on detected zero-crossings 242 of the geomagnetic readings. Then, readings from at least one of the magnetometers 140 and from at least one accelerometer 150 are used to perform the calculation of the offset.

Alternative arrangements are possible. For example, at least two accelerometers 150 can obtain orthogonal gravitational readings to divide the rotation into the divisions based on detected zero-crossings of the gravitational readings. Then, readings from at least one of the accelerometers 150 and from at least one magnetometer 140 can be used to perform the calculation of the offset.

In such an alternative arrangement using the at least two accelerometers 150, the various steps (212), (214), and (216) applied in FIG. 4 to the magnetometer readings from the at least two magnetometers 140 can be applied to the accelerometer readings from the at least two accelerometers 150, as alternatively depicted in FIG. 4. Of course, readings from at least two accelerometers 150 and from at least two magnetometer 140 can both be used to perform the calculation of the toolface offset. In such an arrangement, the various steps (212), (214), and (216) in FIG. 4 can be applied to both of the magnetometer readings and the accelerometer readings. Selection then of one approach or the other (e.g., magnetometer-based or accelerometer-based zero-crossings to determine quadrants and trigonometric calculations) can then be made as circumstances necessitate.

Figure 6A:
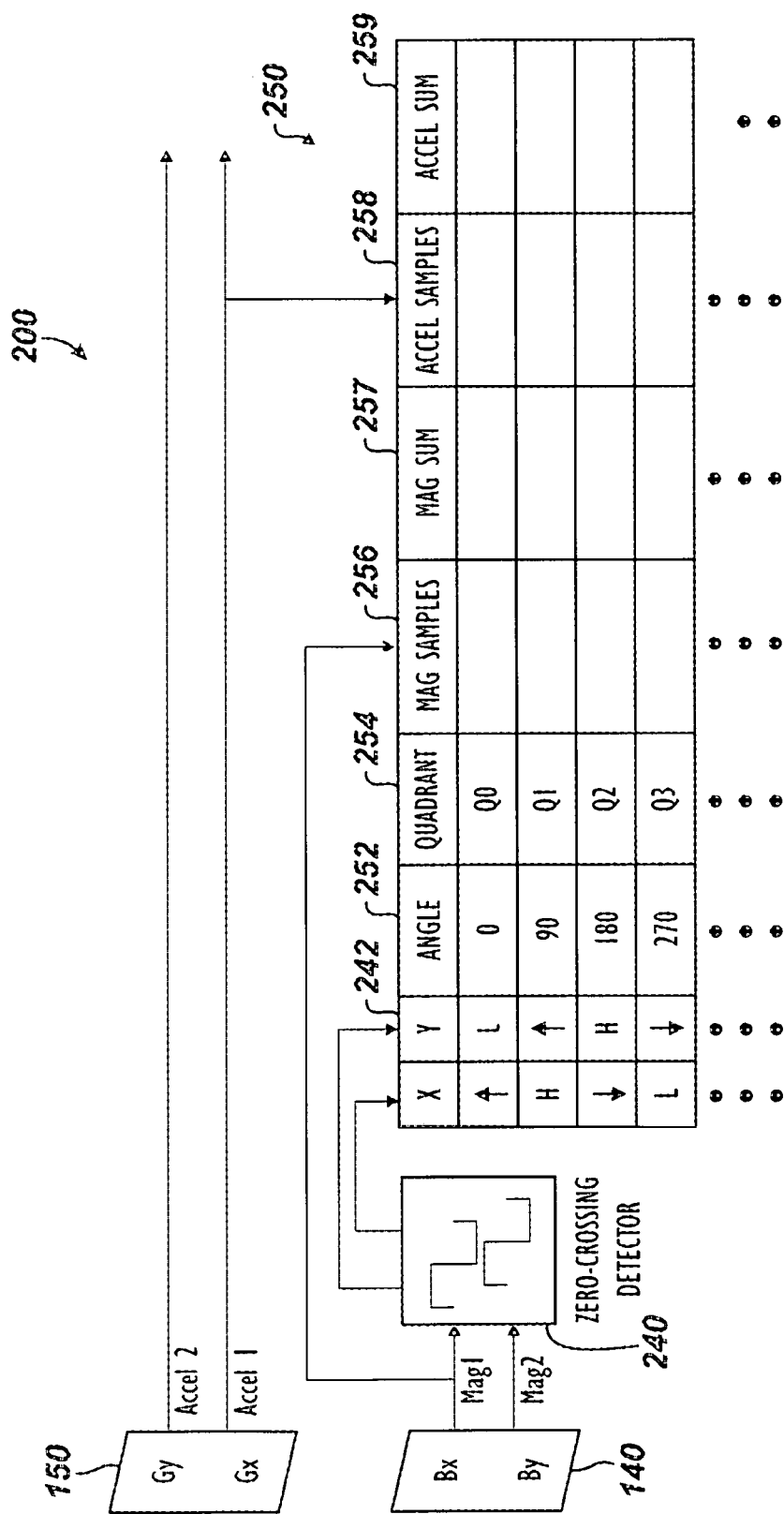

With an understanding of the control technique 200 provided above, discussion turns to the particulars of the sensor processing performed. Referring to FIG. 6A, the sensor processing in the control technique 200 are diagramed. The X-Y accelerometers 150 are shown providing accelerometer readings, and the X-Y magnetometers 140 are shown providing magnetometer readings. Both magnetometer readings are fed into a zero-crossing detector 240, which determines zero-crossings 242 of the waveforms. These zero-crossings 242 corresponds to angles 252 of the different rotary quadrants quadrant (Q0, Q1, Q2, and Q3) in a computational structure 250 of the steering mechanism 100. The samples from one of the magnetometers are collected 256 and are summed 257 for each quadrant. Likewise, the samples from one of the accelerometers are collected 258 and are summed 259 for each quadrant. This information is then used to derive the toolface offset as disclosed in more details later.

B. SENSOR INPUT QUADRANT FRAMING AND QUADRANT DETECTION

FIG. 6B illustrates the computational structure 250 in more detail with example samples collected and summed in each quadrant for one full rotation of the apparatus 50. Each of the individual magnetometer and accelerometer inputs are acquired using an acquisition framing that partitions single rotations of the apparatus 50 into the four equal angular arcs (i.e., quadrants of 90 degrees).

In this technique, all sensor measurements are preferably acquired using the exact same framing reference so their phase angles can be directly related to each other. As shown in this example, samples can be obtained at every 15 degrees so that each quadrant contains six samples. However, samples can be obtained at any regular increment and can be organized into any number of regular divisions as noted herein as long as the mathematical calculations accommodate these differences.

The demarcation of the four, 90-degree quadrants can be achieved in a variety of ways. For example, mechanically keyed triggering via Hall Effect sensing can be used in the apparatus. In such an arrangement, detectable physical elements (such as teeth on a toothed ring) are arranged at fixed angular intervals in the rotating components of the apparatus, including at least four teeth at 90 degrees to each other.

Alternatively, rapid toolface measurements can be performed using the sensors, such as an angular rate gyroscope 132, the magnetometers 140, and/or the accelerometers 150. In another alternative, a combination of an angular rate gyroscope 132 and the magnetometer 140/accelerometer 150 can provide high resolution and reliable angular position measurements relative to the geomagnetic field B or gravitational field G.

According to the preferred arrangement, the sensor inputs are detected that have characteristic events that occur at multiples of the rotational frequency of the apparatus 50, such as the mid-point cross-overs attributable to a sinusoidal input signal. Thus, as each quadrant is traversed by rotation of the apparatus 50, each sensor input from the magnetometers 140 and accelerometers 150 is repetitively sampled and individually summed with the aggregated value of all previously summed samples from that sensor.

This summation process is repeated for as long as it takes the apparatus 50 to rotate through the 90-degree arc associated with the current quadrant. As the rotation through a particular quadrant reaches its 90-degree boundary, the summed results for each sensor are registered as being equivalent to the integral value for that particular sensor for that particular quadrant of rotation. This sampling process continues until integral values for all sensors (i.e., X-Y magnetometers 140 and X-Y accelerometers 150) have been acquired over a rotational arc equivalent to 360 degrees.

There are two possible integral summation techniques that can be employed to generate the required phase angle measurements of the magnetometer and accelerometer waveforms.

In one technique, each set of summed samples are comprised of a fixed number of samples. Therefore, the integral generated in this manner does not have a component of time associated with it. In other words, the generated integral does not include the time taken to rotate through the quadrant. The advantage of using position based sampling is that the ratio metric nature of the integrals (generated for each quadrant) is not distorted by the presence of unstable rotational modes, such as those occurring during when the drill string experiences stick-slip or the like.

In a second technique, sets of sensor quadrant integrals are generated that are comprised of multiple sets of samples. Each sample is acquired at an equidistant rate within the time domain. Thus, the number of samples that comprise each of the quadrant integral values will vary in direct relationship to the time taken for the apparatus 50 to rotate through each of the quadrants. Thus, under conditions where rotation is not constant, the sensor integrals generated by this fixed rate sampling technique may not be ratiometrically accurate, and an error in the computed phase angle for that sensor may occur.

Both the above techniques can provide the necessary quadrant integrals to produce phase angle results for the sensor inputs sampled in this way. However, integrals acquired using the 'fixed sample rate' methodology require reasonably consistent rotational speed in order to generate reliable phase angle measurements.

Looking at the quadrant integrals in more detail, each time the apparatus 50 completes a rotation through a complete 360 degrees, a set of quadrant integrals corresponding to that rotation are generated. For standard laterally mounted X-Y sensor pairings, sixteen individual measurements are then available for processing, as indicated below:

X-Axis Magnetometer
X-Axis Magnetometer Integral Quadrant 0
X-Axis Magnetometer Integral Quadrant 1
X-Axis Magnetometer Integral Quadrant 2
X-Axis Magnetometer Integral Quadrant 3
Y-Axis Magnetometer
Y-Axis Magnetometer Integral Quadrant 0
Y-Axis Magnetometer Integral Quadrant 1
Y-Axis Magnetometer Integral Quadrant 2
Y-Axis Magnetometer Integral Quadrant 3
X-Axis Accelerometer
X-Axis Accelerometer Integral Quadrant 0
X-Axis Accelerometer Integral Quadrant 1
X-Axis Accelerometer Integral Quadrant 2
X-Axis Accelerometer Integral Quadrant 3
Y-Axis Accelerometer
Y-Axis Accelerometer Integral Quadrant 0
Y-Axis Accelerometer Integral Quadrant 1
Y-Axis Accelerometer Integral Quadrant 2
Y-Axis Accelerometer Integral Quadrant 3

Continuous periods of rotation will therefore generate individual sets of quadrant integrals at a rate that is directly proportional to the speed of rotation. This therefore provides the steering mechanism 100 with an opportunity to statistically improve the accuracy of the overall toolface offset measurement by averaging toolface offset results over multiple rotations. There is also the opportunity to systematically reject datasets based on a validity criterion that is driven by the detection of unsuitable drilling conditions, such as stick-slip or the like. In this way, data sets that would otherwise increase the noise margin of the toolface offset measurements can be ignored in the processing.

Having the integral summations 257, 259 of the sensor samples in FIG. 6B, trigonometric identities are used to calculate accelerometer and magnetometer phase angles. As shown in particular in the structure 260 of FIG. 6C, the sensor processing determines the sine and cosine derivations from the quadrant summations. In particular, a generalized set of equations for the trigonometric identities pertaining to each of the individual sensor sets is shown below:

$Q0$=Sensor Axis Integral Quadrant $0$=$A$ ($-\sin \alpha + \cos \alpha$)+$B$ $Q1$=Sensor Axis Integral Quadrant $1$=$A$ ($-\sin \alpha - \cos \alpha$)+$B$ $Q2$=Sensor Axis Integral Quadrant $2$=$A$ ($\sin \alpha - \cos \alpha$)+$B$ $Q3$=Sensor Axis Integral Quadrant $3$=$A$ ($\sin \alpha + \cos \alpha$)+$B$ The above trigonometric identities can be manipulated such that the individual quadrant integral values, for each sensor, generate both sine and cosine components.

$((Q2+Q3)-Q0-Q1)=A \sin \alpha$ $((Q0+Q3)-Q1-Q2)=A \cos \alpha$

Thus, the sine component is derived from a first combination of trailing quadrants (Q2+Q3) of a rotation having leading quadrants (Q0+Q1) of the rotation subtracted therefrom. The cosine component is derived from a second combination of alternating leading quadrants (Q0+Q3) of the rotation having alternating trailing quadrants (Q1+Q2) of the rotation subtracted therefrom.

These sine and cosine components can then be processed. As shown in the structure 270 of FIG. 6D, the sensor processing calculates the magnetic and gravitational toolfaces using a standard trigonometric arctangent (ARCTAN) equation of the sine and cosine components from the structure 260. The ARCTAN equation generates the angular phase relationship of the peak output value (of each sensor) within its quadrant based acquisition framing. Thus, the toolface of the sensors maximum output is represented by the output of the equation shown below:

$\alpha$=ARCTAN of ($A \sin \alpha / A \cos \alpha$)

Using the processing described above, each of the sensors' quadrant integrals can be converted into a phase angle that is relative to the quadrant based acquisition framing. Thus, 'quadrant integral' inputs result in 'phase angle' measurements (for each of the sensors) as follows:

a) X-Axis Magnetometer Quadrant integrals are used to compute X-Axis Magnetometer phase angle (Mag_X TF)
b) Y-Axis Magnetometer Quadrants integrals are used to compute Y-Axis Magnetometer phase angle (Mag_Y TF)
c) X-Axis Accelerometer Quadrants integrals are used to compute X-Axis Accelerometer phase angle (Accel_X TF)
d) Y-Axis Accelerometer Quadrants integrals are used to compute X-Axis Accelerometer phase angle (Accel_Y TF)

C. TOOLFACE OFFSET CALCULATION

Then, as shown in the structure 280 of FIG. 6E, the sensor processing calculates the toolface offset (indicated "TFO" in FIG. 6E) as the difference between the magnetic and gravitational toolfaces. In this present example, the calculations provide an angle of 225.00 degrees for the toolface offset.

In particular, using the quadrant based integral sampling technique noted above means that all of the magnetometers 140 and accelerometers 150 have a common acquisition framing reference. It therefore follows that their individual 'phase angle' relationships (computed using the relationships detailed above) are directly relative to one another. Thus, the toolface offset (i.e., angle between matching peaks and troughs of the gravity and magnetic waveforms) can be computed by subtracting their respective phase angle measurements, as shown below:

TFO=Accel_$X$ TF−Mag_$X$ TF.

TFO=Accel_$Y$ TF−Mag_$Y$ TF

Alternative accelerometer configurations can be used to cancel the effects of centripetal acceleration.

The above processing describes the use of the X-Y pairs of magnetometers 140 and accelerometers 150 mounted laterally on the apparatus 50. However, this configuration sees the bias point of the accelerometer output being conditioned by both the speed of rotation and the distance between the accelerometers 150 and the central axis of rotation.

By offsetting additional laterally mounted accelerometers 150 immediately opposite the original pair (i.e., 180 degrees away), it is then possible to combine their outputs, either via analog electronics or digital processing, such that the centripetal component of acceleration is cancelled out. Substituting the inputs of the original X-Y pair of accelerometers 150 with inputs that have been combined to cancel centripetal acceleration will generate quadrant integral measurements that are less prone to errors induced by variations in rotation rate. In this way, the overall noise margin of the output from the toolface offset calculation will also be improved. Details of such techniques can be found in co-pending U.S. Pub. No. 2015/0101865, which is incorporated herein by reference.

D. ADVANTAGES

A number of challenges complicate determining a toolface offset measurement while drilling. One challenge involves the processing overhead required by a processing unit in a downhole apparatus. Prior to being processed, each sensor has to typically be compensated for scale, bias, and misalignment errors. This requirement to have calibrated sensor values tends to introduce additional processing overhead. Advantageously, the techniques of the present do not have to do such additional processing and can function with sensors that have not been calibrated.

As an additional challenge, processing typically needs the sensors' measured values to represent truly orthogonal X-Y pairs. To do this, all of the sensors would typically be sampled at exactly the same instant in time. Any delays in the acquisition of the individual inputs may manifest themselves as apparent sensor orthogonality errors, which in turn induce errors in the overall accuracy of the computed toolface offset.

The processing techniques of the present disclosure, however, can reduce or overcome these challenges. Due to the ratio metric nature of the calculations employed in the disclosed techniques, for example, the accuracy of the toolface offset generated may not require that the sensor inputs be compensated for either bias or scale factor. As a result, sensor calibration coefficients may not need to be generated during the system's manufacture. Also, the sensor will not need to be calibrated on the fly for temperature, pressure, etc.

The requirement to sample the orthogonal X-Y sensor pairs at the same time is eased by halving the number of instantaneous samples that are required to generate the toolface offset measurement using the disclosed techniques. Instead of four (4) samples (i.e. 2×Accels, 2×Mags), the disclosed processing technique has the advantage that it can generate a toolface offset measurement using samples from just one accelerometer and one magnetometer, i.e. two (2) samples verses the typical four (4) samples required.

The disclosed processing techniques can use an angular rate gyroscope 132 to provide a high resolution position reference for controlling the apparatus' steering. As already noted, this high resolution position reference can be used in addition to zero-crossings from magnetometers 140 and accelerometers 150 to define additional position increments. Integral samples of the angular rate gyroscope 132 can be acquired at predetermined positional increments based on the disclosed processing techniques, rather than using a fixed sample rate. Integral values acquired using a larger number of positional triggers provide superior ratiometric accuracy under conditions where rotation is varying significantly, such as during stick-slip or the like.

The magnetometer and accelerometer mid-point (zero) crossing events are used to generate the quadrant-based acquisition framing of the disclosed technique, which demarcates the 90-degree arc boundaries associated with each of the four sensor integral measurements.

Using the disclosed processing technique, the toolface offset can be measured using just a single (laterally mounted) magnetometer and accelerometer (rather than X-Y pairs). The accuracy of the result is dependent on the rate of rotation remaining constant for a period at least equal to or greater than the time it takes to complete a single rotation. This rotational consistency then allows quadrant integrals to be demarcated solely on the basis of time measurements.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of operating an apparatus while advancing with rotation in a borehole, the method comprising:
    determining angular position of the apparatus about an axis of the apparatus relative to the borehole during the rotation in the borehole by using angular rate readings from an angular rate sensor of the apparatus;
    correcting the determination of the angular position of the apparatus relative to a toolface offset of the apparatus by:
        dividing each of the rotations into a plurality of divisions using at least one orthogonal pair of a plurality of toolface sensors of the apparatus;
        determining a magnetic toolface of the apparatus during the rotation based on geomagnetic readings from at least one geomagnetic sensor of the toolface sensors of the apparatus in each of the divisions of the rotation relative to the geomagnetic field of reference,
        determining a gravitational toolface of the apparatus during the rotation based on gravitational readings from at least one gravitational sensor of the toolface sensors of the apparatus in each of the divisions of the rotation relative to the gravitational field of reference, and
        calculating the toolface offset of the apparatus as a difference between the magnetic toolface and the gravitational toolface; and
    directing the apparatus in the borehole based on the corrected angular position.

2. The method of claim 1, wherein determining the magnetic and gravitational toolfaces for correcting the determination of the angular position of the apparatus relative to the toolface offset comprises:
    obtaining the geomagnetic readings of the apparatus from the at least one geomagnetic sensor relative to the geomagnetic field of reference during the rotation;
    obtaining the gravitational readings of the apparatus from the at least one gravitational sensor relative to the gravitational field of reference during the rotation;
    dividing the rotation into quadrants for the plurality of divisions using at least one of the geomagnetic and gravitational readings;
    summing the geomagnetic readings in each of the quadrants for first sums; and summing the gravitational readings in each of the quadrants for second sums.

3. The method of claim 2, wherein determining the magnetic toolface of the apparatus comprises:
deriving a sine component of the magnetic toolface from a first combination of the first sums of the quadrants;
deriving a cosine component of the magnetic toolface from a second combination of the first sums of the quadrants; and
calculating the magnetic toolface from an arctangent of the sine and cosine components.

4. The method of claim 2, wherein determining the gravitational toolface of the apparatus comprises:
deriving a sine component of the gravitational toolface from a first combination of the second sums;
deriving a cosine component of the gravitational toolface from a second combination of the second sums; and
calculating the gravitational toolface from an arctangent of the sine and cosine components.

5. The method of claim 2, wherein dividing the rotation into the quadrants using at least one of the geomagnetic and gravitational readings comprises detecting zero-crossings for at least orthogonal ones of the geomagnetic or gravitational readings;
and using the detected zero-crossings as dividing points for the quadrants.

6. The method of claim 1, wherein determining the angular position of the apparatus during the rotation in the borehole comprises:
obtaining the angular rate readings of the rotation from the angular rate sensor of the apparatus;
obtaining angular position readings of the apparatus about the axis of the apparatus relative to the borehole during the rotation; and
adjusting the angular rate readings based at least on the angular position readings to determine the angular position of the apparatus.

7. The method of claim 6, wherein obtaining the angular rate readings from the angular rate sensor of the apparatus further comprises one or more of:
integrating the angular rate readings from the angular rate sensor to obtain the angular position readings in high resolution;
using the angular position readings in high resolution as a framing reference in addition to, or in substitution for, using zero-crossings from magnetometers or accelerometers of the toolface sensors as the framing reference;
using only a single magnetometer or accelerometer of the toolface sensors when using the angular rate sensor; and
using the angular rate sensor in place of a geostationary framing element.

8. The method of claim 6, wherein obtaining the angular position readings of the apparatus during the rotation to adjust the angular rate readings obtained from the angular rate sensor comprises deriving the angular position readings from the geomagnetic readings of the apparatus relative to the geomagnetic field during the rotation.

9. The method of claim 6, wherein obtaining the angular position readings of the apparatus during the rotation comprises calculating, for each of one or more states of the angular position readings in one or more orthogonal axes, a resolved angular orientation corrected by the toolface offset.

10. The method of claim 9, wherein the one or more orthogonal axes comprises X-Y directions; and wherein calculating comprises detecting zero-crossings for the X-Y directions of the angular position readings at four of the states in each of the X-Y directions.

11. The method of claim 10, wherein adjusting the angular rate readings based at least on the angular position readings comprises adjusting the angular rate readings accumulated over time by the resolved angular orientations.

12. The method of claim 1, wherein dividing each of the rotations comprises detecting zero-crossings for at least orthogonal ones of the geomagnetic or gravitational readings from the at least one orthogonal pair of the toolface sensors; and using the detected zero-crossings as dividing points for the divisions.

13. The method of claim 1, further comprising adjusting the calculated offset of the toolface by at least one dynamic parameter based on information of inclination and azimuth of the apparatus.

14. The method of claim 1, wherein directing the apparatus comprises:
advancing the borehole by imparting rotation to the apparatus;
determining actuations of at least one actuator on the apparatus during the rotation for steering the apparatus towards a target direction relative to the corrected angular position of the apparatus; and
deviating the apparatus in the advancing borehole in response to the determined actuations of the at least one actuator.

15. The method of claim 14, wherein determining the actuations of the at least one actuator during the rotation for steering the apparatus toward the target direction relative to the corrected angular position of the apparatus comprises determining a first angular orientation to start the actuation and a second angular orientation to stop the actuation for each of the at least one actuator.

16. The method of claim 14, wherein deviating the apparatus in the advancing borehole in response to the determined actuations of the at least one actuator comprises using a point-the-bit configuration or a push-the-bit configuration of the at least one actuator.

17. An apparatus advancing with rotation in a borehole, the apparatus comprising:
at least one sensing element comprising:
an angular rate sensor configured to obtain angular rate readings of the apparatus about an axis of the apparatus relative to the borehole during rotation, and
a plurality of toolface sensors configured to obtain geomagnetic readings of the apparatus relative to the geomagnetic field during the rotation and configured to obtaining gravitational readings of the apparatus relative to the gravitational field during the rotation; and
a control system in operable communication with the at least one sensing element and configured to:
use the angular rate readings from the angular rate sensor to determine angular position of the apparatus during the rotation in the borehole;
divide each of the rotations into a plurality of divisions using at least one orthogonal pair of the toolface sensors;
determine a magnetic toolface of the apparatus during the rotation based on the geomagnetic readings of the apparatus in each of the divisions of the rotation relative to the geomagnetic field;
determine a gravitational toolface of the apparatus during the rotation based on the gravitational readings of the apparatus in each of the divisions of the rotation relative to the gravitational field;

calculate a toolface offset of the apparatus as a difference between the magnetic toolface and the gravitational toolface; and correct the angular position of the apparatus relative to the calculated toolface offset.

18. The apparatus of claim 17, further comprising at least one actuator being actuatable to direct the apparatus in advancing the borehole, the control system configured to direct the apparatus with the at least one actuator in the borehole based on the corrected angular position.

19. The apparatus of claim 18, wherein the at least one actuator being actuatable to direct the apparatus in advancing the borehole comprises a point-the-bit configuration or a push-the-bit configuration.

20. The apparatus of claim 17, wherein the at least one sensing element comprises magnetometers of the toolface sensors oriented orthogonally in two-axes obtaining angular position readings, and wherein the control system is configured to adjust the angular rate readings based at least on the angular position readings to determine the angular position of the apparatus.

21. The apparatus of claim 17, wherein the toolface sensors of the at least one sensing element comprise: at least one accelerometer obtaining the gravitational readings, and at least two magnetometers obtaining the geomagnetic readings; and wherein the control system is configured to:

divide the rotation into the divisions based on the geomagnetic readings; and perform the calculation of the toolface offset based on the gravitational readings from the at least one accelerometer and the geomagnetic readings from at least one of the magnetometers.

* * * * *